United States Patent [19]

Fafa

[11] 4,002,808
[45] Jan. 11, 1977

[54] ELECTROCHEMICAL CELL

[75] Inventor: Jean Fafa, Paris, France

[73] Assignee: Compagnie Industrielle des Piles Electriques Cipel, Levallois Perret, France

[22] Filed: Feb. 18, 1975

[21] Appl. No.: 550,748

[30] Foreign Application Priority Data

Feb. 26, 1974 France .............................. 74.06468

[52] U.S. Cl. ............................................. 429/157
[51] Int. Cl.² ......................................... H01M 6/42
[58] Field of Search ................. 136/87, 135 R, 181, 136/111

[56] References Cited

UNITED STATES PATENTS

| | | | |
|---|---|---|---|
| 2,225,460 | 12/1940 | Porth | 136/135 R |
| 2,672,498 | 3/1954 | Temple | 136/111 |
| 2,864,880 | 12/1958 | Kaye | 136/111 |
| 3,089,072 | 5/1963 | Jephcott | 136/135 R |
| 3,615,867 | 10/1971 | Cich | 136/111 |
| 3,748,182 | 7/1973 | Brown | 136/111 |
| 3,864,172 | 2/1975 | Marks | 136/181 |

Primary Examiner—John H. Mack
Assistant Examiner—H. A. Feeley
Attorney, Agent, or Firm—Kenyon & Kenyon Reilly Carr & Chapin

[57] ABSTRACT

The invention relates to electrochemical cells intended to be electrically connected up in series. Such a connection is obtained by means of a mechanical link between the terminals of opposite polarities of two adjacent cells. That mechanical link may be formed by a spring-catch system, screwing or locking. The invention applies more particularly to cylindrical electric cells.

15 Claims, 8 Drawing Figures

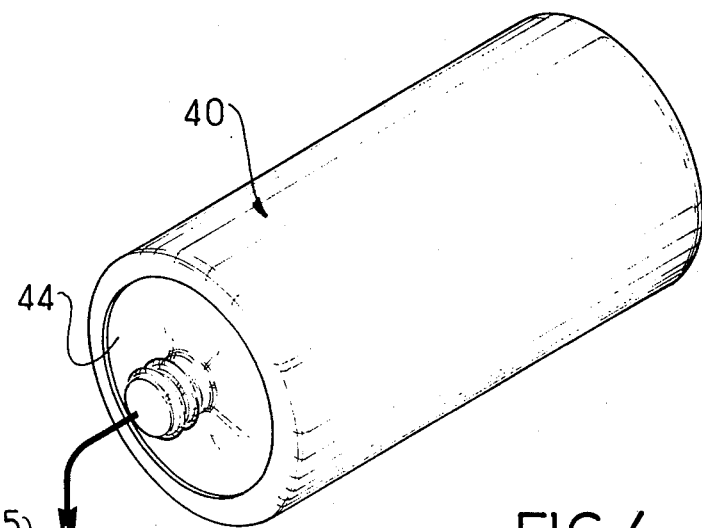
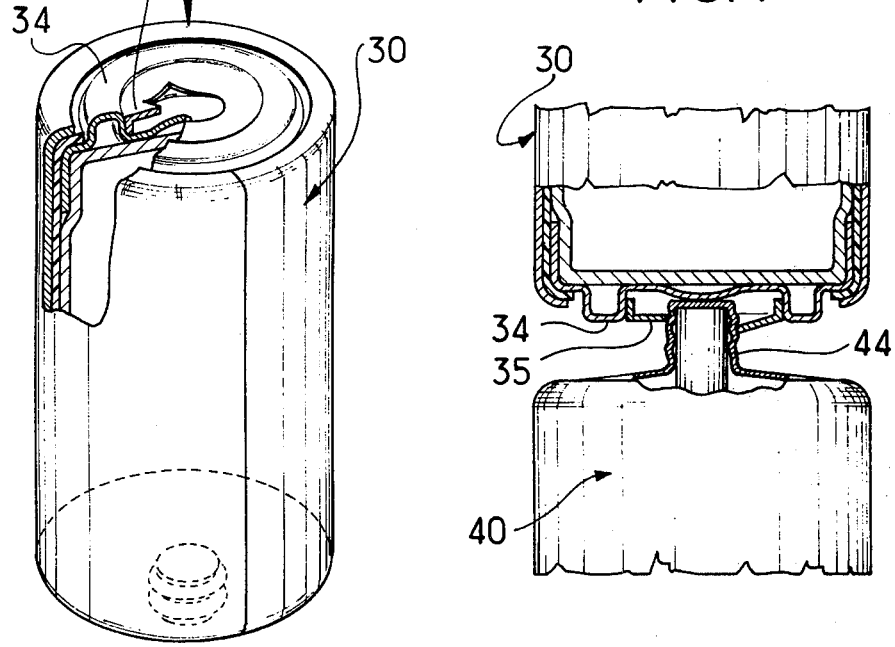

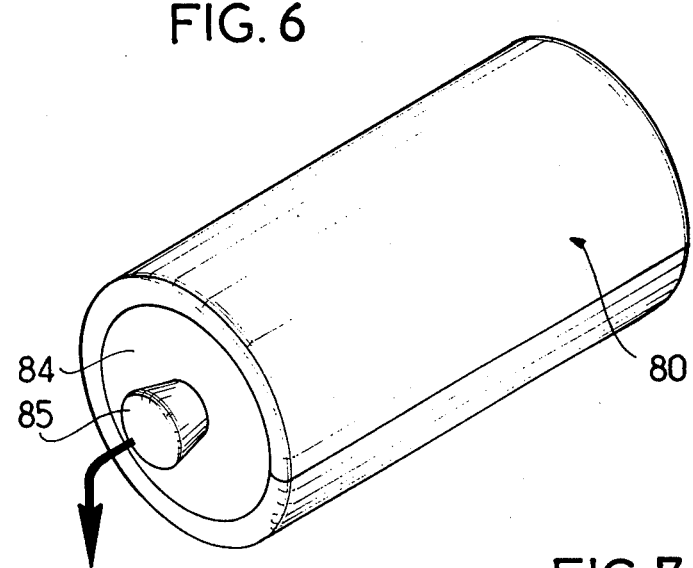
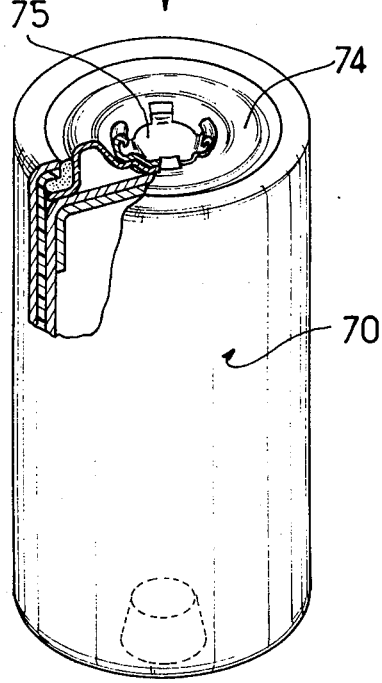
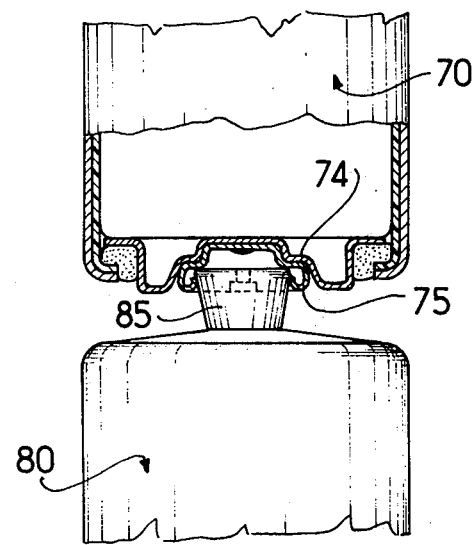

ELECTROCHEMICAL CELL

The invention relates to electrochemical cells and, more particularly, to cylindrical electric cells intended to be electrically connected together in series.

Numerous devices require the use of two, three or even, sometimes, four cells placed end to end. The electrical connection is generally provided between cells of a same column by springs placed at the ends of the said column.

Such a device has several disadvantages. Indeed, the cells are difficult to put in their place, for they are not well supported laterally; moreover, the end springs, which are often too weak, cause bad electrical contacts between the cells of a same column.

To overcome these disadvantages, German Pat. No. 494,929 describes a cell having two protruding terminals on two opposite faces. These terminals are made in such a way as to be able to co-operate together by screwing, locking, spring catch systems, etc., to ensure simultaneously an electrical and mechanical connection between two identical cells. Although such a cell is a solution for the problem set, it has the disadvantage of not complying, inasmuch as concerns its bulk dimensions, with the recommendations of the International Electrotechnical Commission relating to cells, R6, R14 and R20 (Publication 86-2, third edition, 1972, "Electric cells — Second part: specifications sheets," pages 32 to 37). These recommendations, indeed, provide for a plane contact surface at the negative pole, in relation to which any protruding part is limited to 1.5 mm for R6 and R14 cells and 2 mm for R20 cells (difference between dimensions A and B). Moreover, the projections provided for the specifications are situated on the periphery of the cells and not at the centre, where they could hinder the insertion of a cell according to the patent in a recess provided for a cell according to the recommendations of the IEC. It follows that the use of cells according to the patent requires suitable recesses. Another disadvantage of these cells, which is not negligible, is that they may be positioned vertically, this making the packing, storing and handling thereof more difficult.

The present invention therefore aims at providing an electrochemical cell which may easily and reliably be connected up in series by alinement end to end, while complying with the recommendations of the IEC and being able to stand vertically.

The present invention has as its object an electrochemical cell provided with a casing having two opposite faces and comprising a metal cup, a terminal of a first polarity formed by a protruding pin on one of the said faces and a second terminal of the opposite polarity provided with a socket outside the said cup capable of co-operating with the pin of another cell similar to the said cell so as to connect the two cells electrically and to fasten them together; the said cell is characterized in that the said second terminal has a substantially plane surface constituting a portion of the second of the said faces and that no part of the said socket protrudes from the said surface.

According to a first embodiment, the said socket and the said pin co-operate by screwing.

According to a second embodiment, the said socket and the said pin co-operate by locking, as by the socket having at least one notch in which at least one stud belonging to the said pin is engaged.

According to a third embodiment, the said socket and the said pin co-operate by a spring catch system, such as those of the push-button type.

The invention is applied, to great advantage, to a cylindrical cell in which the terminal having the first polarity is constituted by a metal cap covering, for example, the end of a graphite rod belonging to the positive electrode; the second terminal may be constituted by a metal cup or a bottom disk in electrical contact with the negative electrode, comprising, for example a zinc cup.

According to one embodiment providing an advantage, the said pin is formed by an end piece welded on the protruding portion of the said cap and the said socket is formed by a part welded in a recess in the said bottom cup. The socket may be constituted by a disk externally covering the bottom disk or the sealing cup of the cylindrical cell. The pin may also be constituted by the cap itself and the socket may be formed directly in the cup or the bottom disk.

Other particularities and the advantage of the invention will become apparent from the following description, which will be made with reference to the accompanying drawing, given by way of an illustration but having no limiting character, in which:

FIG. 3 illustrates diagrammatically in a perspective view two electrochemical cells intended to be screwed together according to a variant of embodiment.

FIG. 4 illustrates diagrammatically a partly cutaway view of the cells in FIG. 3, fixed together.

FIG. 6 illustrates diagrammatically a perspective view of two electrochemical cells according to the invention intended to be fixed together by a spring catch system.

FIG. 7 illustrates diagrammatically in a partly cutaway view the two cells in FIG. 6 fastened together.

Figures 1, 2A, 2B:
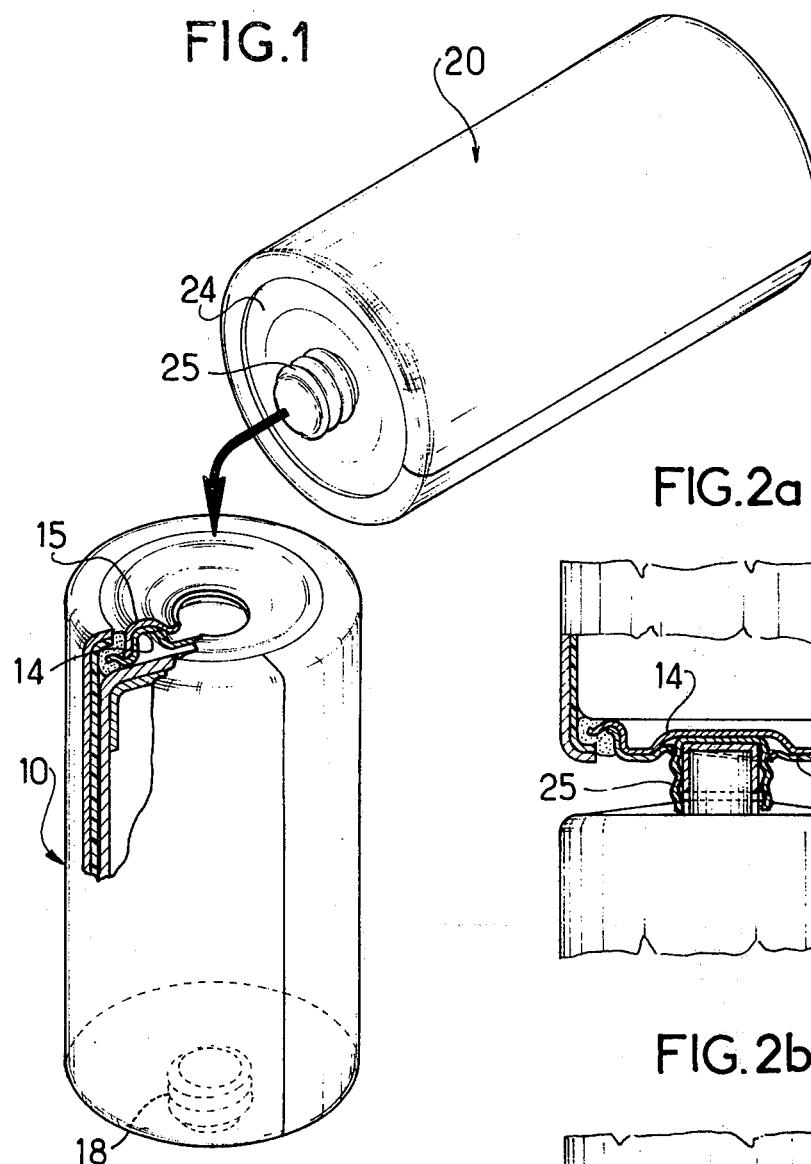
FIG. 1 is a diagrammatic perspective view of two electrochemical cells according to the invention which may be connected together by screwing.
FIGS. 2a and 2b illustrate very diagrammatically in a partly cutaway view two positions of the two cells in FIG. 1.

FIG. 1 shows a cylindrical cell 10 whose positive terminal 18 projects and whose negative terminal 16 is a metal cup having a portion of plane surface is constituted as shown in FIG. 2a by two superimposed disks 14 and 15 encircled by a seal 13 compressed by the turned-down edges of two superimposed lateral casings, a casing 11 made of plastic material covering the negative electrode 16 of the cell and an outer metal casing 12. The positive terminal 18 of the cell 10 is similar to the terminal 25 of a cell 20 identical to the cell 10; the terminal 25 is a metallic end piece welded to a metal, cap 24 covering, for example, a central conductive rod 26 belonging to the positive electrode. The cap 24 is surrounded on the outside by a seal 23 onto which are turned down the edges of the lateral casings 21 and 22 of the cell 20.

The disk 15 has a central orifice intended to co-operate with the threaded end-piece 25. FIG. 2a illustrates the position of the two cells 10 and 20 at the beginning of the screwing, whereas FIG. 2b illustrates these two cells at the end of the screwing: the pin constituted by the end piece 25 abutting on the disk 14, the screwing of the pin in the socket causes a deformation of the disk 15. The perimeter of the orifice forming the socket comprises a portion of helix having the same pitch as the pin, or an arc of a circle which may be deformed into a portion of helix by the screwing of the pin. The diameter of that arc of a helix or of a circle corresponds substantially to the diameter of the bottom of the thread of the pin.

FIGS. 3 and 4 illustrate two cylindrical cells 30 and 40 also intended to be screwed together. In this variant of embodiment, the sealing cup 34 of the cell 30 has, at the level of its central part, a recess intended for accomodating a welded socket 35; the latter is intended to co-operate with a pin constituted by a cap 44 belonging to the cell 40.

Figure 5:
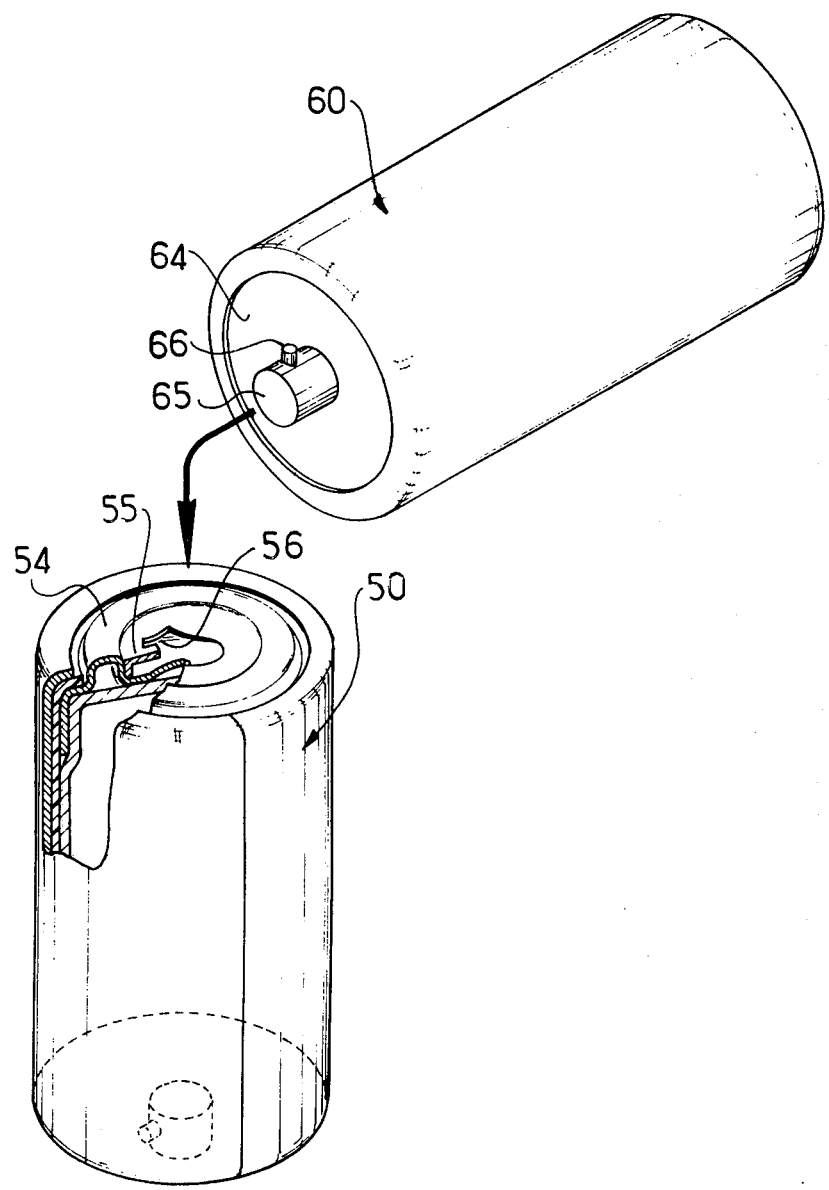
FIG. 5 illustrates diagrammatically a perspective view of two electrochemical cells according to the invention, intended to be locked together.

FIG. 5 illustrates two identical cells 50 and 60 intended to be locked together. In this variant, the bottom cup 54 of the cell 50 has a central recess in which is accomodated a socket 55 provided with at least one notch 56. The latter is intended to co-operate with a stud 66 provided on a metal pin 65 welded on a cap 64 connected to the positive electrode of the cell 60.

Locking is effected by a rotation of the cell 60 in relation to the cell 50.

FIGS. 6 and 7 relate to two identical cells 70 and 80 intended to be connected electrically and mechanically by a spring catch system. The bottom disk 74 of the cell 70 has a central recess in which is welded a socket 75 having an elastically deformable notched edge. The latter is intended to co-operate with a pin 85 welded to the positive cap 84 of the cell 80. The pin 85 may have a slightly conical lateral surface force fitted into the socket 75. A similar result may be obtained by a spring catch system of the press-button type.

Whatever the variants of embodiment may be, the structure of an electrochemical cell according to the invention makes it possible to effect series connections which are very easy and very safe of several identical cells, the mechanical connection being provided at the same time as the electrical connection.

Although a cell according to the invention comprises accessories necessary for the coupling thereof with an identical cell, it keeps to the overall dimensions recommended by the International Electrotechnical Commission and may be put in contact with any other cell having the same module. Indeed, the inside diameter of the socket of the negative terminal is chosen larger than the diameter of the positive terminals of existing cells. Hence, in the embodiment illustrated by FIGS. 1 and 2, the socket on a cell according to the invention is not deformed when it is in contact with the positive terminal of any cell, whereas it has the capability of being deformed when the positive terminal of an identical cell is plugged into it.

It must be understood that the invention is not limited to the embodiments described and illustrated; without going beyond the scope of the invention, certain means may be replaced by equivalent means.

I claim:

1. Electrochemical cell comprising a casing having two opposite ends, a metal electrode cup constituting one of the electrodes of said cell and having a closed bottom located inwardly of an end of said casing, a terminal of first polarity for another electrode of said cell projecting ouwardly from the other end of said casing and a second terminal of opposite polarity comprising socket means fixed to the closed end of said electrode cup externally thereof, and thus being isolated from the interior of said electrode cup, said socket means comprising a deformable disc including a portion that will receive and cooperatively engages with the pin-like member of another cell like said cell so and to connect said two cells electrically and also fix them to each other, said second terminal having a substantially plane surface constituting a portion of the first-named end of said casing of said cell with no part of said disc protruding outwardly from said plane surface until said disc is tightly engaged and deformed outwardly by the pin member of another cell, whereby said cell maybe stood on said plane surface at said first named end prior to being connected to said another cell.

2. Electrochemical cell according to claim 1, characterized in that the said disc and the said pin-like member co-operate by screwing.

3. Electrochemical cell according to claim 1, characterized in that the said disc and the said pin-like member co-operate by locking.

4. Electrochemical cell according to claim 3, characterized in that said disc has at least one notch, and a pen-like member has at least one stud on said pin-like member engageable with said notch.

5. Electrochemical cell according to claim 1, including spring catch means of the push button type for effecting interengagement of said disc and said pin-like member.

6. Cylindrical electrochemical cell according to claim 1 characterized in that said first terminal having the first polarity is a metal cap covering the outer end of a positive electrode and in that said second terminal is constituted by a metal bottom part in electrical contact with the negative electrode.

7. Cylindrical electrochemical cell according to claim 6, characterized in that the said pin-like member is formed by an end piece welded on the said cap.

8. Electrochemical cell according to claim 6 characterized in that said second terminal includes a part welded in a recess in the said bottom part.

9. Electrochemical cell comprising an electrode cup having a closed bottom and constituting a negative electrode for said cell, a positive electrode within said cup having a portion extending outwardly of said electrode cup, a pin mounted on said protruding portion and constituting one terminal of said cell, an insulative casing surrounding side walls of said electrode cup, an external metallic casing surrounding said insulative casing, said two casings having turned down end edges overlapping opposite ends of said negative electrode cup, said electrode cup having a flat surface at its bottom lying inwardly of turned down ends of said casings, and deformable metallic socket means electrically connected to said flat surface of said electrode cup on its outer face and constituting the second terminal of said cell, said socket means being cooperatively engageable with the pin of another cell similar to said cell to connect the two cells electrically and to secure them to each other, said socket means presenting a plane surface by which said cell may be stood on end prior to being connected to another cell.

10. Cell according to claim 9 wherein said pin is threaded to interengage the socket means of another similar cell.

11. Cell according to claim 10 wherein said socket means comprises a pair of superposed discs one of which is in contact with said flat surface and the other of which is deformable has an orifice into which the pin of a similar cell may be engaged thereby deforming the other of said discs to maintain the electrical connection between and the securement of said two cells together.

12. Electrical cell according to claim 11 wherein each said pins have threads and the said orifice in said other of said discs constitutes a portion of a helix having the same pitch as the threads of the pin and into which the threads of the pin of a similar cell may be screwed.

13. Electrical cell according to claim 10 wherein said pin has threads and said socket means comprises a member electrically secured to said cup and having a recess and a deformable disc mounted in said recess into which a pin of a similar cell may be screwed to electrically connect and secure the two cells together.

14. Electrical cell according to claim 10 wherein said pin has at least one lateral stud and said socket means comprises a member electrically connected to said electrode cup and having a recess and a socket mounted in said recess, said part having at least one notch, and into which a pin and stud of a similar cell may be inserted to electrically connect and secure said two cells together.

15. Electrical cell according to claim 10 wherein said pin has a conical surface flaring outwardly and said socket means includes a socket disc having a recess with an elastically deformable notched edge into which the like pin of a similar cell may be force fitted to electrically connect the two cells and secure them together.

* * * * *

UNITED STATES PATENT AND TRADEMARK OFFICE
CERTIFICATE OF CORRECTION

PATENT NO. : 4,002,808
DATED : January 11, 1977
INVENTOR(S) : Jean Fafa

It is certified that error appears in the above-identified patent and that said Letters Patent are hereby corrected as shown below:

Col. 4, line 1, "engages" should read --engage--;

Col. 4 line 21, "pen" should read --pin--;

Col. 4, line 67, insert --and-- after "deformable"; and

Col. 6, line 4, "socket" should read --part--.

Signed and Sealed this

Nineteenth Day of April 1977

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 4,002,808
DATED : January 11, 1977
INVENTOR(S) : Jean Fafa

It is certified that error appears in the above-identified patent and that said Letters Patent are hereby corrected as shown below:

Col. 5, line 9 : "10" should read --9--.

Col. 6, line 1 : "10" should read --9--.

Col. 6, line 9 : "10" should read --9--.

*Signed and Sealed this*

*Sixth* Day of *June 1978*

[SEAL]

*Attest:*

RUTH C. MASON
*Attesting Officer*

DONALD W. BANNER
*Commissioner of Patents and Trademarks*